United States Patent
Tanaka

(10) Patent No.: US 9,568,815 B2
(45) Date of Patent: Feb. 14, 2017

(54) LIGHT SOURCE UNIT AND PROJECTOR

(71) Applicant: Seiko Epson Corporation, Tokyo (JP)

(72) Inventor: Katsunori Tanaka, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 108 days.

(21) Appl. No.: 14/207,173

(22) Filed: Mar. 12, 2014

(65) Prior Publication Data

US 2014/0293242 A1 Oct. 2, 2014

(30) Foreign Application Priority Data

Mar. 26, 2013 (JP) .................................. 2013-063560

(51) Int. Cl.
*G03B 21/16* (2006.01)
*G03B 21/14* (2006.01)
*G03B 21/20* (2006.01)

(52) U.S. Cl.
CPC ............ *G03B 21/16* (2013.01); *G03B 21/145* (2013.01); *G03B 21/2026* (2013.01)

(58) Field of Classification Search
CPC ... G03B 21/16; G03B 21/2093; H04N 9/3141; H04N 9/3144
USPC ................ 353/57, 60–61, 119; 362/294, 373
See application file for complete search history.

(56) References Cited

U.S. PATENT DOCUMENTS

| 5,418,586 | A | * | 5/1995 | Fujimori et al. ............... 353/122 |
| 8,083,357 | B2 | * | 12/2011 | Fukui et al. ...................... 353/58 |
| 2006/0170881 | A1 | * | 8/2006 | Seki ....................... G03B 21/10 353/85 |
| 2006/0209544 | A1 | | 9/2006 | Nishikawa et al. |
| 2008/0117389 | A1 | * | 5/2008 | Hamada ................. G03B 21/16 353/119 |
| 2010/0026966 | A1 | * | 2/2010 | Nakano ........................... 353/61 |
| 2011/0188008 | A1 | * | 8/2011 | Maeda ................... G03B 21/28 353/85 |

FOREIGN PATENT DOCUMENTS

| JP | 2006-259027 A | 9/2006 |
| JP | 2008-091052 A | 4/2008 |
| JP | 2008-176199 A | 7/2008 |

* cited by examiner

*Primary Examiner* — Sultan Chowdhury
(74) *Attorney, Agent, or Firm* — ALG Intellectual Property, LLC

(57) ABSTRACT

A light source unit includes a light source, a connecting conductor configured to supply power to the light source, a light source housing configured to accommodate the light source and the connecting conductor. At least part of the connecting conductor is provided on a gripping portion side of the light source housing, and the light source housing includes a lid-side forming portion configured to cover the gripping portion side of the light source and the connecting conductor, and a flow channel configured to guide cooling air to a cover portion of the lid-side forming portion.

6 Claims, 8 Drawing Sheets

LIGHT SOURCE UNIT AND PROJECTOR

CROSS REFERENCE TO RELATED APPLICATIONS

This application claims priority to Japanese Patent Application No. 2013-063560 filed on Mar. 26, 2013, the entire contents of which are incorporated by reference herein.

BACKGROUND

1. Technical Field

The present invention relates to a projector.

2. Related Art

In the related art, a projector configured to modulate light emitted from a light source unit in accordance with image information and project the modulated light onto a projection surface such as a screen is known. In the light source unit, a discharging type light source such as an extra high pressure mercury lamp is employed in many cases, and the light source unit is configured to be demountably mountable (see JP-A-2008-176199).

The light source unit described in JP-A-2008-176199 includes a light-source lamp, a reflector, a housing configured to accommodate these members in the interior thereof, and a spring member. The reflector is supported and fixed to the housing by using the spring member. The housing is provided with a grip which is configured to be griped by a user, and the grip is gripped for mounting and demounting the light source unit on and from the projector.

JP-A-2008-176199 discloses a drawing in which the spring member is arranged in an exposed manner on the side where the grip of the light source unit is formed. Although the material of the spring member is not described in JP-A-2008-176199, it is considered to be a metal in order to secure the strength required for fixing the reflector to the housing. Although it is not described in JP-A-2008-176199, it is considered that a connecting conductor for supplying power to the light source lamp is laid at a position sufficiently away from the spring member considering a case where the user touches the spring member when mounting and demounting the light source unit.

However, in the light source unit described in JP-A-2008-176199, in order to lay the connecting conductor away from the spring member, assembly could become complex, and an excessive load could be applied to the connecting conductor when being bent at a sharp angle for wiring to a connecting portion to be connected to a power source unit.

SUMMARY

An advantage of some aspects of the invention is to solve at least a part of the problems described above, and the invention can be implemented as the following forms or application examples.

Application Example 1

This application example is directed to a light source unit including a light source configured to emit light; a connecting conductor configured to supply power to the light source; and a light source housing configured to accommodate the light source and the connecting conductor, and including a gripping portion, wherein at least part of the connecting conductor is provided on the gripping portion side of the light source housing, and the light source housing includes: a lid-side forming portion configured to cover the light source and the gripping portion side of the connecting conductor, and a flow channel configured to introduce cooling air to at least part of the lid-side forming portion.

In this configuration, the light source housing is provided with the lid-side forming portion configured to cover the light source and the gripping portion side of the connecting conductor. Accordingly, even when the connecting conductor and a conductive member positioned in the vicinity of the connecting conductor (for example, the member configured to fix the light source to the light source housing or the member configured to block the light from the light source) are arranged so as to be positioned on the gripping portion side with respect to the light source, the lid-side forming portion covers these members. Therefore, a user is prevented from touching or coming close to these members when replacing the light source unit.

Since the light source housing is provided with the flow channel configured to guide the cooling air to at least part of the lid-side forming portion, the lid-side forming portion that is increased in temperature may be cooled down by covering the gripping portion side of the light source.

Therefore, the light source, the connecting conductor, and the conductive member are reliably kept away from the user when the user mounts and demounts the light source unit, whereby deterioration of the light source housing due to the temperature may be suppressed while enhancing wiring flexibility of the connecting conductors and the flexibility in shape of the conductive member. Therefore, the light source unit which has a longer lifetime while achieving easiness of manufacture and improvement of design flexibility is provided.

Application Example 2

In the light source unit of the application example described above, it is preferable that the light source housing includes: an outflow port configured to allow cooling air flowed through the flow channel to go out toward the lid-side forming portion, on the gripping portion side, and a main flow channel configured to allow the cooling air to flow to the light source, and the flow channel guides part of the cooling air flowing through the main flow channel to the outflow port.

In this configuration, the light source housing is provided with the main flow channel configured to allow the cooling air to flow therethrough to the light source, and the part of the cooling air flowing through the main flow channel is guided by the flow channel and is fed to the lid-side forming portion from the outflow port. Accordingly, since an area through which the cooling air is caused to flow may be increased in comparison with a case where the flow channel and the main flow channel are formed individually, efficient cooling of an object to be cooled is achieved.

Application Example 3

In the light source unit of the application example described above, it is preferable that the light source unit includes a reflector configured to reflect light emitted from the light source, and the light source includes a light-emitting tube having a pair of electrodes and a pair of lead wires configured to be electrically connected to the pair of electrodes, one of the pair of lead wires is arranged on a side of the reflector where the light is reflected, the connecting conductor includes a first connecting conductor to be connected to the one of the lead wires and a second connecting conductor to be connected to the other lead wire, and part of the first connecting conductor is arranged at a position where the cooling air flowing out from the outflow port of the light source housing passes.

In this configuration, since the one of the lead wires is arranged on the side of the reflector where the light is reflected, the first connecting conductor connected to the lead wire is increased in temperature. However, the part of the first connecting conductor is arranged at the position where the cooling air flowed out from the outflow port passes, and hence is cooled by the cooling air fed to the lid-side forming portion. Therefore, the light source unit provided with the light-emitting tube having the pair of electrodes is effectively cooled.

Application Example 4

In the light source unit of the application example described above, it is preferable that the light source housing includes a guide portion configured to position the connecting conductor in cooperation with the lid-side forming portion.

In this configuration, since the light source housing is provided with the guide portion configured to position the connecting conductor in cooperation with the lid-side forming portion, the connecting conductor is reliably laid at a predetermined position on the gripping portion side of the light source. Therefore, further stable cooling of the connecting conductor by the cooling air fed to the lid-side forming portion and reduction of the load applied to the connecting conductor during the step of manufacturing the light source unit and when handling the light source unit are achieved.

Application Example 5

This application example is directed to a projector including the light source unit described above, an external housing configured to accommodate the light source unit and having an opening through which the light source unit is mounted and demounted; and a lid member configured to close the opening.

In this configuration, the same advantages as the light source unit described above are achieved. In particular, in a position in which the projector provided with the light source unit according to Application Example 1 is installed, in the configuration in which the lid member is positioned above the light source unit, the lid-side forming portion is positioned above the light source, so that more remarkable advantages are achieved.

BRIEF DESCRIPTION OF THE DRAWINGS

The invention will be described with reference to the accompanying drawings wherein like numbers reference like elements.

DESCRIPTION OF EXEMPLARY EMBODIMENTS

Figure 1:
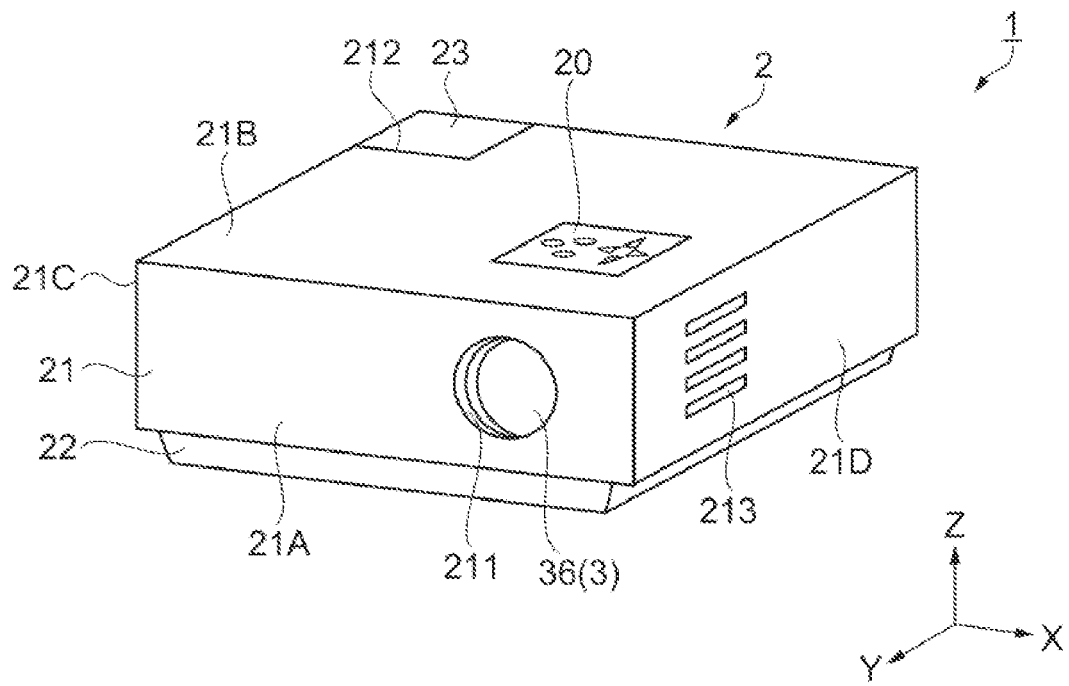
FIG. 1 is a perspective view schematically illustrating an appearance of a projector of an embodiment.

Referring now to the drawings, a projector according to an embodiment will be described.

The projector of the embodiment is configured to modulate light emitted from a light source in accordance with image information and project the modulated light on a projection surface such as a screen in an enlarged scale. The projector of the embodiment is configured to be capable of projecting in a standing position in which the projector is placed on a desk or the like, and a suspending position in which the position is inverted upside down from the standing position and is installed on a ceiling or the like.

Principal Configuration of Projector

Figure 2:
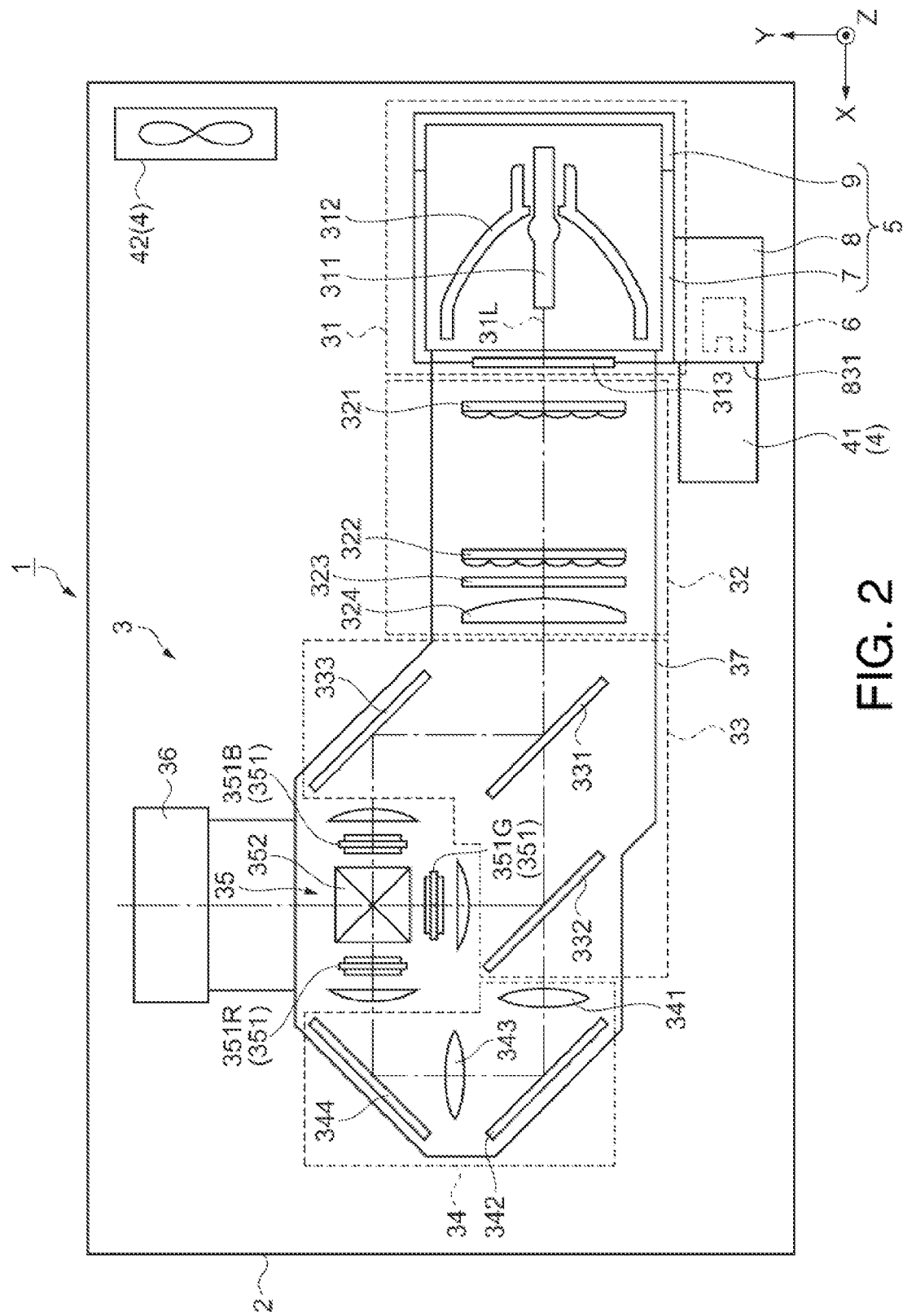
FIG. 2 is a diagrammatic drawing illustrating a schematic configuration of the projector of the embodiment.

FIG. 1 is a perspective view schematically illustrating an appearance of a projector 1 of the embodiment. FIG. 2 is a diagrammatic drawing showing a schematic configuration of the projector 1 of the embodiment.

The projector 1 includes an external housing 2 constituting an exterior, a control unit (not illustrated), an optical unit 3 having a light source unit 31 and formed into a substantially L-shape in plan view, and a cooling unit 4 as illustrated in FIG. 1 and FIG. 2. Although not illustrated in the drawing, a power supply unit configured to supply power to the light source unit 31 and the control unit is arranged in an interior of the external housing 2. In the following description, a direction in which an optical flux goes out from the light source unit 31 is described as +X direction, a direction in which light projected from the projector 1 goes out is described as +Y direction (forward direction), and an upper side of the projector 1 in the standing position is described as +Z side for the sake of convenience of description.

The external housing 2 is formed of a synthetic resin and, as illustrated in FIG. 1, includes an upper case 21 constituting an upper portion, a lower case 22 constituting a lower portion, and a lid member 23.

A projection opening 211 is formed on a front surface 21A of the upper case 21, and a projection lens 36 provided in the optical unit 3 is arranged in the external housing 2 inside the projection opening 211. Light emitted from the projection lens 36 passes through the projection opening 211, and is projected on the projection surface arranged in the front.

An operation panel 20 is arranged on an upper surface 21B of the upper case 21. The operation panel 20 includes various keys for issuing various commands such as a menu key configured to switch display/non-display of a menu image to be used for various settings of the projector 1, and a source switching key configured to switch an input source.

An opening 212 positioned above the light source unit 31 is formed on the upper surface 21B of the upper case 21, and the lid member 23 closes the opening 212. The light source unit 31 is mounted and demounted from the opening 212 from which the lid member 23 is removed.

An intake port 213 configured to take in outside air is formed on a side surface 21D of the upper case 21 on a +X side, and an exhaust port (which is not illustrated) configured to discharge inside air is formed in a side surface 21C on the side opposite to the side surface 21D. A dust-proof filter, which is not illustrated, is arranged inside the intake port 213, and entry of dust mixed in the outside air into the interior of the external housing 2 is suppressed.

The control unit including a CPU (Central Processing Unit), a ROM (Read Only Memory), a RAM (Random Access Memory) and the like functions as a computer, and is configured to control the operation of the projector 1, for example, control relating to projection of images.

Configuration of Optical Unit

The optical unit 3 optically processes the light emitted from the light source unit 31 and projects the same under the control of the control unit.

The optical unit 3 includes, in addition to the light source unit 31, an integrator lighting optical system 32, a color separating optical system 33, a relay optical system 34, an electric optical unit 35, the projection lens 36, and an optical component housing 37 configured to arrange these optical components 31 to 36 at predetermined positions on an optical path as illustrated in FIG. 2.

The optical unit 3 includes the light source unit 31 demountably arranged at one end portion thereof and the projection lens 36 arranged on the other end portion thereof as illustrated in FIG. 2.

The light source unit 31 includes a discharge type light source 311 including an extra-high pressure mercury lamp or a metal halide lamp, a reflector 312, a collimator lens 313, a light source housing 5.

Figure 3:
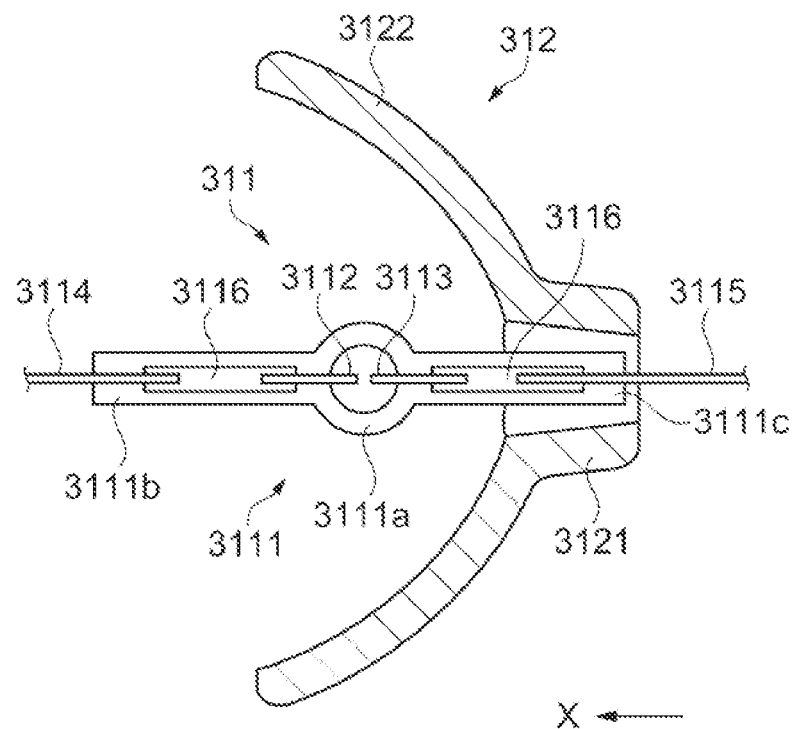
FIG. 3 is a cross-sectional view of a light source and a reflector of the embodiment.

FIG. 3 is a cross sectional view of the light source 311 and the reflector 312.

The light source 311 includes a light-emitting tube 3111, a pair of electrodes 3112 and 3113, and lead wires 3114 and 3115 as illustrated in FIG. 3.

The light-emitting tube 3111 is formed of heat-resistant glass such as quartz glass, and includes a spherical light-emitting portion 3111a provided at a center, and a pair of sealing portions 3111b and 3111c extending from both sides of the light-emitting portion 3111a as illustrated in FIG. 3.

A discharging space in which mercury, noble gas, and halogen are sealed is formed in the light-emitting portion 3111a, and the pair of electrodes 3112 and 3113 are arranged in the discharging space with distal ends thereof face each other in the proximity.

A pair of metallic foils 3116 configured to be electrically connected to the electrodes 3112 and 3113 respectively are arranged in the interiors of the pair of sealing portions 3111b and 3111c.

The lead wires 3114 and 3115 are connected to the pair of metallic foils 3116 and extend to the outside of the sealing portions 3111b and 3111c. When power is supplied to the lead wires 3114 and 3115, electric discharge occurs between the opposed electrodes 3112 and 3113, so that the light source 311 emits light.

Here, the light source 311 generates heat by alight emission of the light-emitting tube 3111. A temperature rise is significant in an upper portion of the light source 311 than in a lower portion thereof due to an influence of heat convection or the like and, specifically, the temperature near a surface of an upper portion of the light-emitting portion 3111a is liable to rise.

If the temperature of the upper portion of the light-emitting portion 3111a rises excessively due to insufficient cooling, a base material is recrystallized, and hence white turbidity occurs. In contrast, if the temperature of a lower portion of the light-emitting portion 3111a is lowered excessively due to the excessing cooling, a halogen cycle is not performed normally in the electrodes 3112 and 3113, and hence the base material of the electrodes 3112 and 3113 is adhered to an inner wall of the light-emitting portion 3111a, whereby blackening may occur. If the white turbidity or the blackening occurs, the corresponding part loses its clarity, and hence light amount emitted from the light-emitting portion 3111a is reduced, and breakage or deterioration of the light-emitting tube 3111 may result due to a high temperature. Therefore, when cooling the light-emitting tube 3111, it is preferable to start cooling from the upper side of the light-emitting tube 3111 to avoid generation of a temperature difference between the upper portion and the lower portion.

The temperature of the sealing portion 3111b, which is positioned in an area of light emitted from the light-emitting portion 3111a, is liable to rise and, for example, the temperature of a connecting portion between the metallic foil 3116 and the lead wire 3114 and the like rises significantly. If such portions are not sufficiently cooled, the metallic foils 3116 are oxidized and hence are blackened. Consequently, absorption of light is accelerated and hence the temperature further increases, so that the breakage or deterioration of the light-emitting tube 3111 may result. Therefore, when cooling the light source 311, it is preferable to cool also the sealing portion 3111b effectively in addition to the light-emitting portion 3111a.

The reflector 312 has a cylindrical neck portion 3121 and a reflecting portion 3122 widening from the neck portion 3121 in a substantially concave shape in cross section as illustrated in FIG. 3.

The neck portion 3121 is provided with an insertion hole configured to insert the sealing portion 3111c. The light source 311 includes the sealing portion 3111b positioned on a side opposite to the neck portion 3121. An adhesive agent is injected between the sealing portion 3111c and the insertion hole, so that the light source 311 is fixed to the reflector 312.

The reflecting portion 3122 includes a metal thin film deposited on an inner surface thereof so as to reflect the light emitted from the light-emitting portion 3111a to a direction away from the neck portion 3121. In other words, the light source 311 is fixed to the reflector 312 so that the sealing portion 3111b and the lead wire 3114 are positioned in a light area reflected by the reflector 312.

The light source unit 31 is configured to reflect the light emitted from the light source 311 by the reflector 312 and then align the direction of ejection by the collimator lens 313, and eject the light toward the integrator lighting optical system 32.

The light source housing 5 accommodates the light source 311 and the reflector 312, and is provided with a plurality of flow channels which allow passage of cooling air fed from the cooling unit 4. Components which constitute the light source unit 31 other than the light source 311, the reflector 312, and the collimator lens 313 will be described later in detail.

Returning back to FIG. 2, the integrator lighting optical system 32 includes a first lens array 321, a second lens array 322, a polarization converter 323, and a superimposing lens 324, and is configured so that the light emitted from the light source unit 31 is irradiated substantially uniformly on a surface of a liquid crystal light valve 351, which will be described later, and is used effectively.

The color separating optical system 33 includes two dichroic mirrors 331 and 332 and a reflection mirror 333, and has a function to separate the light emitted from the integrator lighting optical system 32 into three color lights; a red light (hereinafter, referred to as "R-light"), a green light (hereinafter, referred to as "G-light"), and a blue light (hereinafter, referred to as "B-light").

The relay optical system 34 includes an incident-side lens 341, a relay lens 343, and reflection mirrors 342 and 344, and has a function to guide the R-light separated by the color separating optical system 33 to the liquid crystal light valve 351 for the R-light. The optical unit 3 has a configuration such that the relay optical system 34 guides the R-light, the invention is not limited thereto, and a configuration in which the B-light is guided is also applicable, for example.

The electric optical unit 35 includes the liquid crystal light valve 351 as a light-modulating unit and a cross-dichroic prism 352 as a color synthesizing optical device, and is configured to modulate respective color lights separated by the color separating optical system 33 in accordance with the image information, and combine the modulated color lights.

The liquid crystal light valve 351 is provided for each of the three color lights (a liquid crystal light valve for the R-light is denoted by 351R, a liquid crystal light valve for the G-light is denoted by 351G, and a liquid crystal light valve for the B-light is denoted by 351B), and each includes a transmissive liquid crystal panel, and an incident side polarizing plate and an outgoing side polarizing plate arranged on both surfaces thereof.

The liquid crystal light valve 351 includes a rectangular pixel area in which minute pixels, which are not illustrated, are formed in a matrix pattern, and the respective pixels are set to a light transmissivity in accordance with display image signals, whereby a display image is formed in the pixel area. Then, the respective color lights separated by the color separating optical system 33 are modulated by the liquid crystal light valve 351, and are emitted to the cross-dichroic prism 352.

The cross-dichroic prism 352 is formed into a substantially square shape in plan view by bonding four rectangular prisms, and two dielectric multilayer films are formed at an interface of bonded rectangular prisms. The cross-dichroic prism 352 is configured to reflect color lights modulated by the liquid crystal light valves 351R and 351B from the dielectric multilayer films, and allow color light modulated by the liquid crystal light valve 351G to pass therethrough to combine the respective color lights.

The projection lens 36 includes a plurality of lenses (which are not illustrated) and projects the light combined by the cross-dichroic prism 352 on the screen in an enlarged scale.

The cooling unit 4 includes a sirocco fan 41 arranged on the rear side (−Y direction) of the light source unit 31 and an axial flow fan 42, and an intake fan, not illustrated arranged on the front side (+Y direction) of the light source unit 31 as illustrated in FIG. 2.

Although detailed description will be given later, the sirocco fan 41 is configured to send the cooling air to an inflow port 831 provided in the light source housing 5 to cool the light source unit 31.

The axial flow fan 42 is configured to discharge air in the interior of the external housing 2, which is warmed up by cooling the light source unit 31, through an exhaust port of the external housing 2 to the outside thereof.

The intake fan feeds cooling air on the outside taken from the intake port 213 of the upper case 21 to the electric optical unit 35.

The power supply unit, which is not illustrated, includes a power supply block and a light source drive block configured to drive the light source unit 31, and supplies power to the control unit and electronic components such as the light source 311. The light source drive block includes an output connector (which is not illustrated) connected to the light source unit 31, and the output connector is arranged in the optical component housing 37 via a cable (which is not illustrated).

Configuration of Light Source Unit

The light source unit 31 will now be described in detail.

Figure 4:
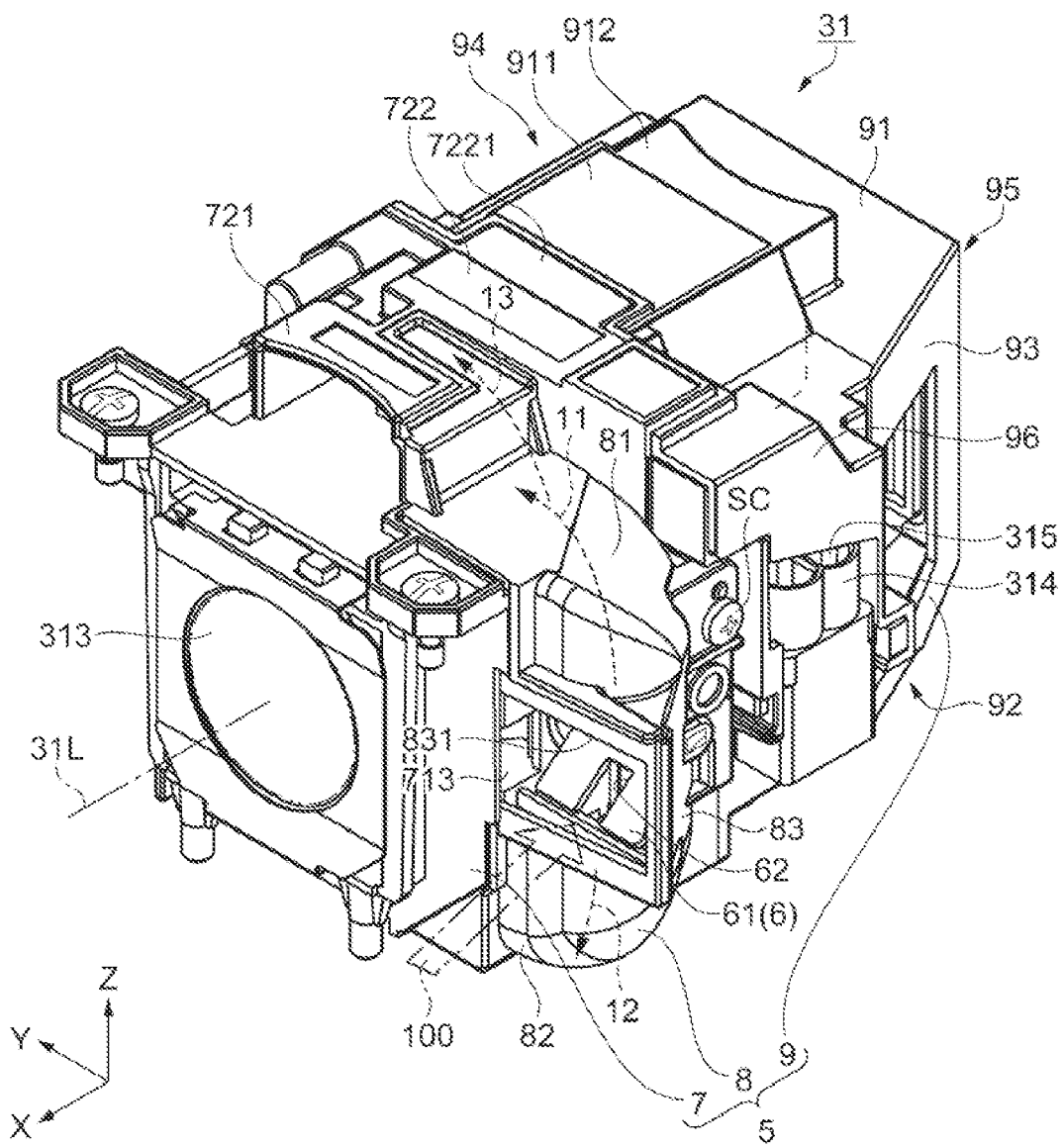
FIG. 4 is a perspective view of a light source unit of the embodiment.

FIG. 4 is a perspective view of the light source unit 31.

The light source unit 31 includes an input connector 314, connecting conductors 315 configured to supply power to the light source 311, the light source housing 5, a rectifying unit 6 configured to rotate to change a flow of cooling air to flow in, and conductive members 316 (see FIG. 8) as illustrated in FIG. 4 in addition to the light source 311, the reflector 312, and the collimator lens 313.

The input connector 314 is a connecting portion configured to be electrically connected to the power supply unit, and is arranged on a −Y side of the light source unit 31 as illustrated in FIG. 4. The input connector 314 is connected to the lead wires 3114 and 3115 (see FIG. 3) of the light source 311 via the connecting conductors 315. The input connector 314 is connected to the output connector of the power supply unit when the light source unit 31 is inserted through the opening 212 of the upper case 21 and mounted in the optical component housing 37. In other words, the input connector 314 is arranged to be fitted to the output connector of the power supply unit by inserting the light source unit 31 downward from above the opening 212. Wiring of the connecting conductors 315 will be described later in detail.

The light source housing 5 includes a first housing 7 configured to accommodate the light source 311 and the reflector 312 (see FIG. 3), a second housing 8 to be arranged on the −Y side of the first housing 7, and a third housing 9 arranged on the −X side of the first housing 7 as illustrated in FIG. 4. The light source housing 5 is provided with the inflow port 831 that allows entry of cooling air fed from the sirocco fan 41 and the plurality of flow channels that allow cooling air entering from the inflow port 831 to flow therethrough.

Figure 5:
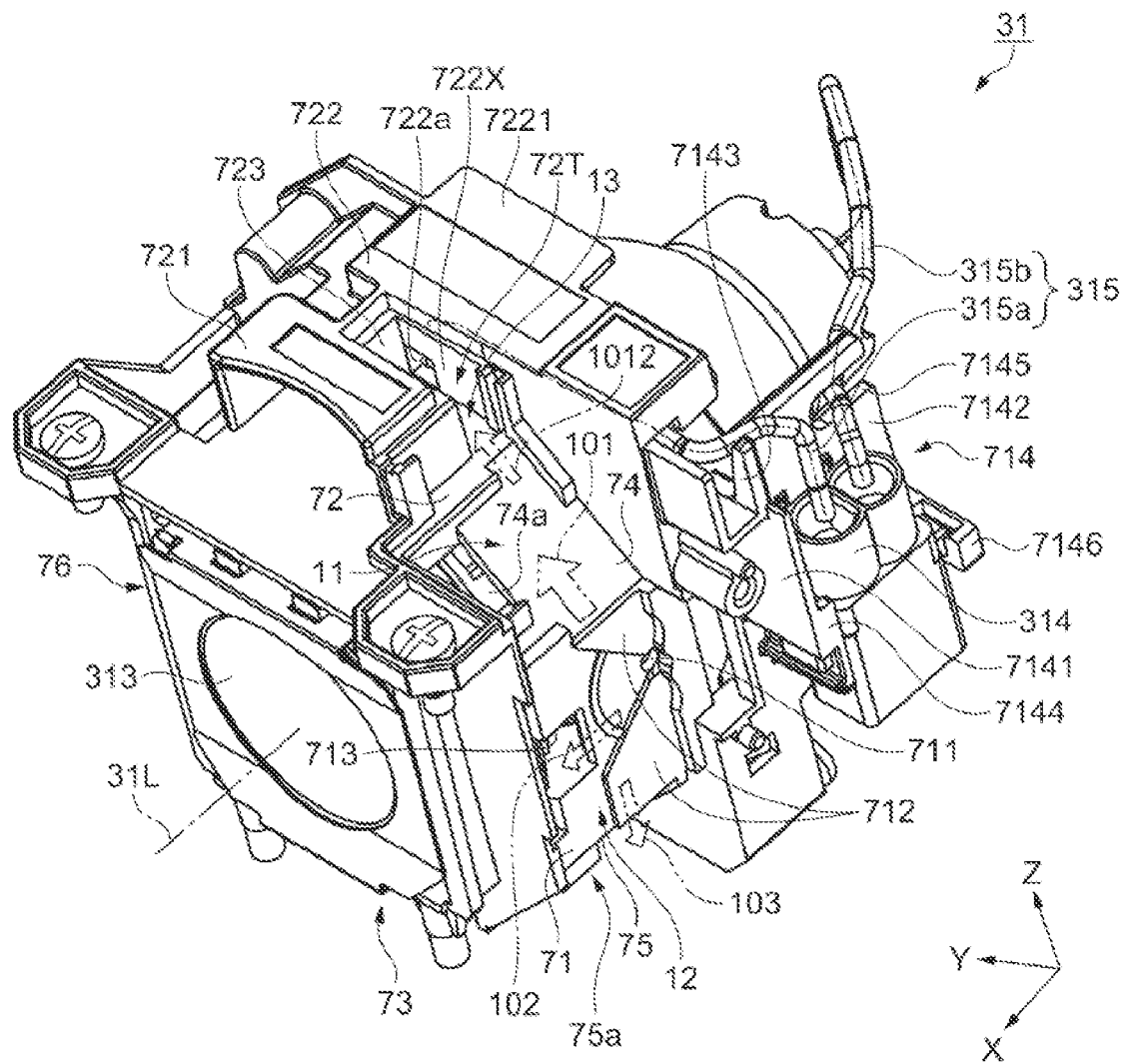
FIG. 5 is a perspective view of the light source unit of the embodiment in a state in which a second housing and a third housing are demounted.
Figure 6:
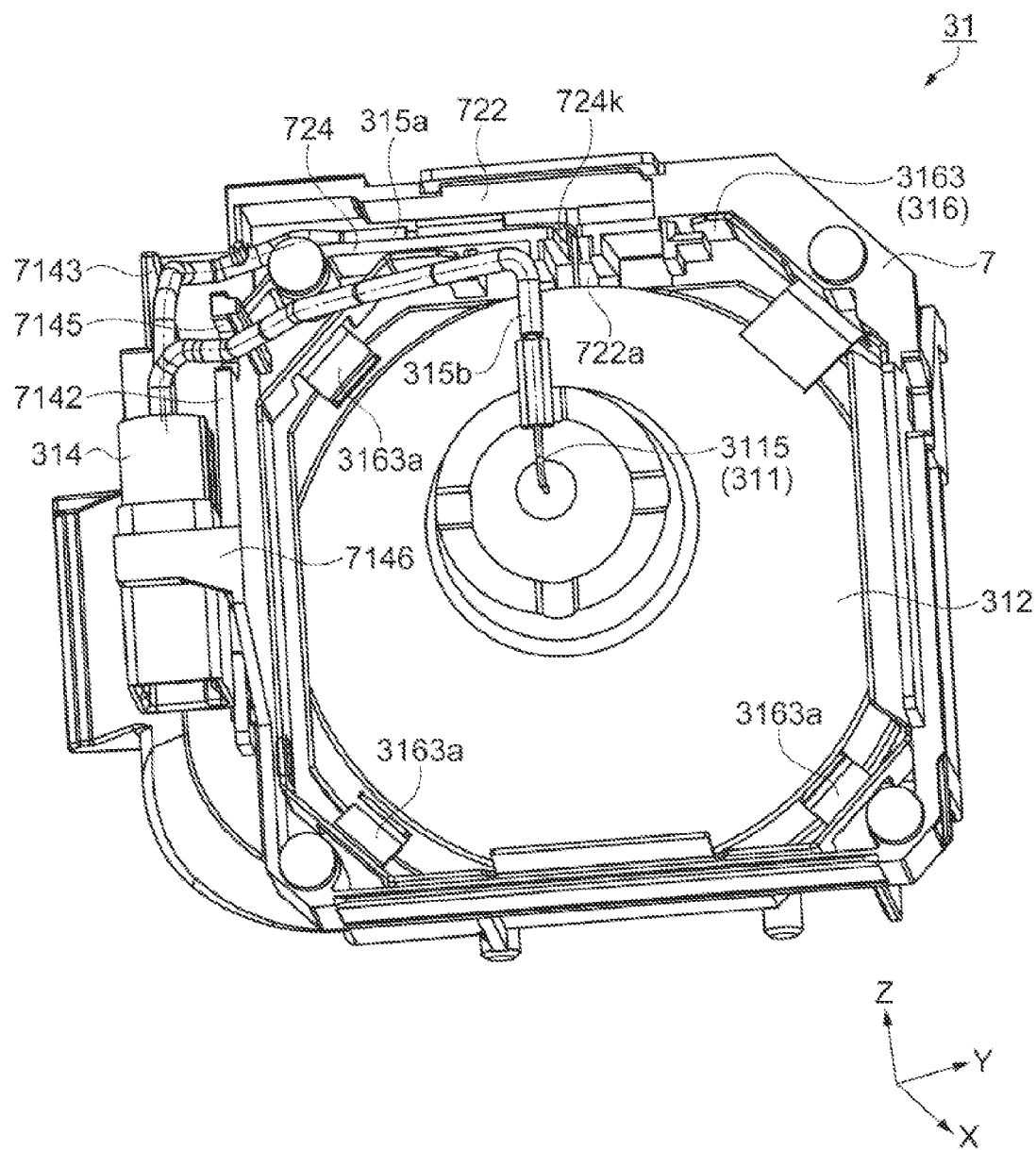
FIG. 6 is a perspective view of the light source unit of the embodiment in a state in which the second housing and the third housing are demounted.
Figure 7:
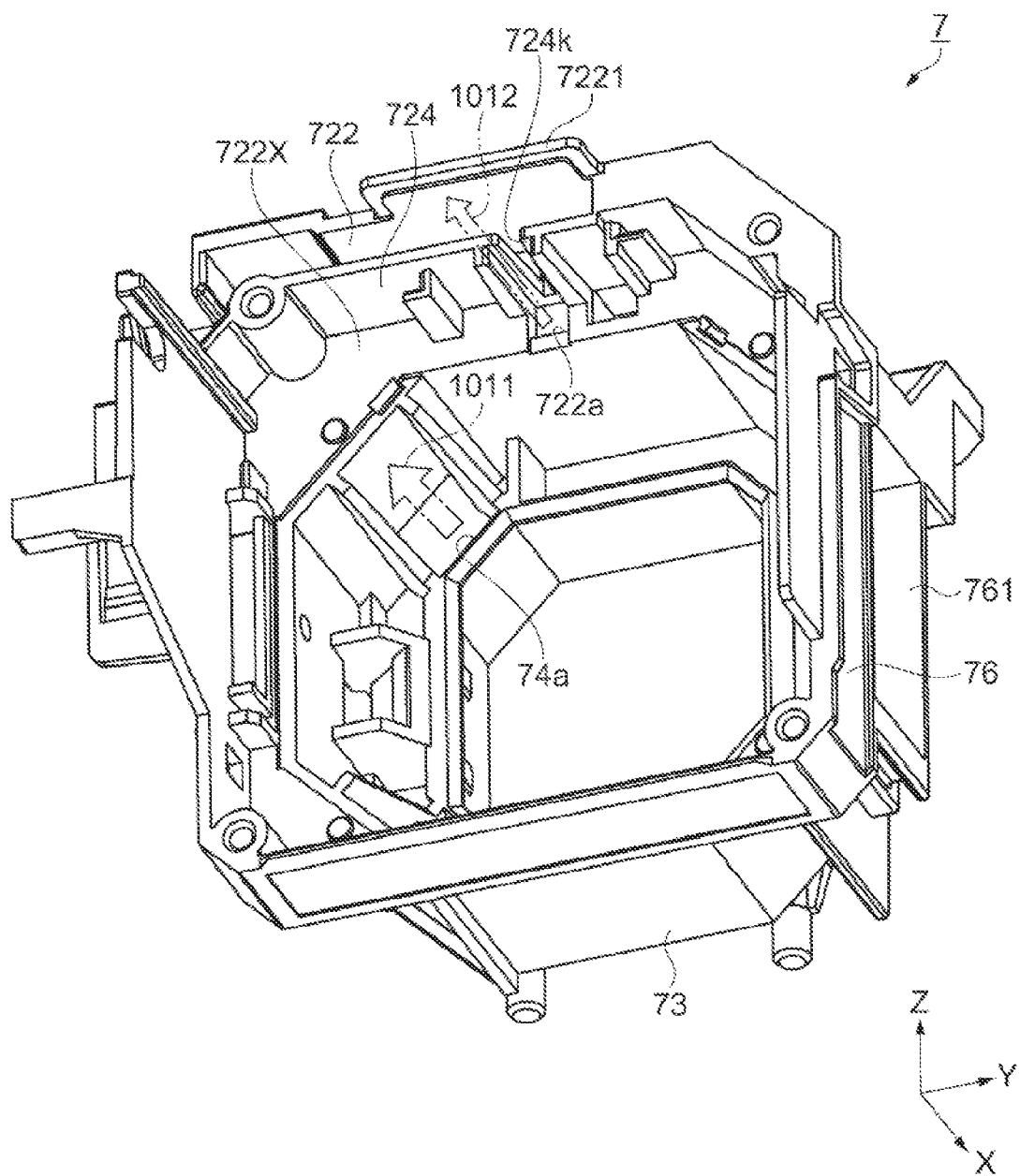
FIG. 7 is a perspective view of a first housing of the embodiment viewed from a −X side.

FIG. 5 and FIG. 6 are perspective views of the light source unit 31 in a state in which the second housing 8 and the third housing 9 are removed. FIG. 5 is a drawing viewed obliquely from the +X side, and FIG. 6 is a drawing viewed obliquely from the −X side. FIG. 7 is a perspective view of the first housing 7 viewed obliquely from the −X side.

The first housing 7 is formed of high heat-resistant synthetic resin and is formed into a substantially parallelepiped box shape as illustrated in FIG. 5 to FIG. 7, and openings are provided on the +X side and the −X side. Then, the collimator lens 313 is arranged at the opening on the +X side as illustrated in FIG. 5, and the reflector 312 to which the light source 311 is fixed is accommodated in the first housing 7 through the opening on the −X side as illustrated in FIG. 6.

The first housing 7 includes side surfaces 71 and 76 that define the −Y side and a +Y side respectively, an upper surface 72 that defines the +Z side, and a lower surface 73 that defines a −Z side, and as illustrated in FIG. 5, inclined surface portions 74 and 75 at corners on the −Y side.

The upper surface 72 includes a gripping portion 721 projecting in a +Z direction, a cover portion 722, and a connecting portion 723 as illustrated in FIG. 5.

The gripping portion 721 is opened on the +X side, and is configured to have an upright wall on the −X side, and is a portion gripped by the user together with a gripping portion 912 (see FIG. 4), which will be described later, provided on the third housing 9. The light source unit 31 is mounted on and demounted from the projector 1 by the user gripping the gripping portions 721 and 912 and moving the same in the Z direction.

The cover portion 722 is formed away from the gripping portion 721 in the −X direction of the gripping portion 721, and as illustrated in FIG. 7, is configured to open on the −X side, and a projecting portion 7221 projecting in the −X direction is provided at a center thereof.

The cover portion 722 is provided with an upright wall 722X on the gripping portion 721 side as illustrated in FIG. 5, and a through hole (outflow port 722a) penetrating in the X direction as illustrated in FIG. 5 and FIG. 7 in the upright wall 722X.

The first housing 7 includes a guide portion 724 also provided on the cover portion 722 and projecting from the upright wall 722X in the −X direction as illustrated in FIG. 7. The guide portion 724 is positioned on the +Z side of the outflow port 722a, and a notch 724k is formed in the guide portion 724 in the vicinity of the outflow port 722a.

The connecting portion 723 is formed so as to connect the gripping portion 721 and the cover portion 722 on the +Y side of the outflow port 722a as illustrated in FIG. 5. In other words, an area 72T having the upper surface 72 as a bottom surface and surrounded by the gripping portion 721, the upright wall 722X and the connecting portion 723 is provided on the +Z side of the upper surface 72. The area 72T defines part of a flow channel 13 branched from a flow channel 11, described later, and cooling air flowing through the flow channel 13 flows into the first housing 7 from the outflow port 722a.

The inclined surface portion 74 is provided between the side surface 71 and the upper surface 72 and the inclined surface portion 74 includes a through hole (an outflow port 74a) as illustrated in FIG. 5. The inclined surface portion 75 is provided between the side surface 71 and the lower surface 73 and the inclined surface portion 75 includes a through hole (an outflow port 75a).

The side surface 71 is provided with a bearing 711, a pair of rotation stopper portions 712, an inlet port 713, and a connector mounting portion 714 as illustrated in FIG. 5.

The bearing 711 is a circular hole in plan view having a center at a center axis extending in a direction substantially orthogonal to a perpendicular plane including an optical axis 31L of the light source 311, and an end of a rotating shaft (which is not illustrated), which will be described later, of the rectifying unit 6 is inserted therethrough. Then, the side surface 71 rotatably supports the rectifying unit 6 in cooperation with the second housing 8.

The pair of rotation stopper portions 712 have a function to limit a range of rotation of the rectifying unit 6, and the rotation stopper portions 712 are provided so as to project outward of the side surface 71. The pair of rotation stopper portions 712 are positioned close to each other on the bearing 711 side, and are inclined so as to extend away from each other as they go toward the bearing 711 in the +X direction.

The inlet port 713 is a through hole configured to introduce part of cooling air flowing inward from the inflow port 831 into an interior of the first housing 7, and as illustrated in FIG. 5, is formed so as to be positioned between the pair of rotation stopper portions 712 in the +X direction of the bearing 711.

The connector mounting portion 714 is formed on the −X side of the bearing 711, and includes an upright wall 7141 projecting in the −Y direction and an upright wall 7142 projecting in the −X direction as illustrated in FIG. 5.

The upright wall 7141 is provided on the +Z side with a projecting portion 7143 projecting further in the +Z direction, and on the −Z side with an engaging portion 7144. The upright wall 7142 is provided with a U-groove 7145 having a U-shape in cross section on a −X side end surface on the +Z side, and with an engaging portion 7146 at a position opposing the engaging portion 7144 on the −Z side. The input connector 314 is arranged in a state of being engaged with the engaging portions 7144 and 7146 as illustrated in FIG. 5 and FIG. 6.

The side surface 76 is provided with an exhaust port 761 from which air in the first housing 7 is discharged to the outside as illustrated in FIG. 7.

The second housing 8 is fixed to the −Y side of the first housing 7 with a screw, and defines the plurality of flow channels in cooperation with the first housing 7 as illustrated in FIG. 4.

The second housing 8 is formed into a box shape opening on the +Y side, and includes a first protruding portion 81 configured to cover the inclined surface portion 74 of the first housing 7 and the +Z side (see FIG. 5) of the area 72T, a second protruding portion 82 configured to cover the inclined surface portion 75 (see FIG. 5), and a housing center portion 83 configured to cover the side surface 71 (see FIG. 5) between the inclined surface portion 74 and the inclined surface portion 75.

A wall portion on the +X side of the housing center portion 83 includes the inflow port 831. The inflow port 831 is formed into a rectangular shape in plan view and allows entry of a flow of cooling air fed from the sirocco fan 41 (see FIG. 2). A mesh-type member, which is not illustrated, is fitted in the inflow port 831 and the exhaust port 761 of the first housing 7 to prevent broken pieces from flying outward around in case of breakage of the light-emitting tube 3111.

The first protruding portion 81 defines the flow channels 11 and 13 in cooperation with the first housing 7. The flow channel 11 guides cooling air entering from the inflow port 831, and the guided cooling air flows out from the outflow port 74a of the first housing 7 into the first housing 7.

The flow channel 13 is formed so as to be branched from the flow channel 11 and guides part of cooling air entering from the inflow port 831, and the guided cooling air flows out from the outflow port 722a of the first housing 7 into the first housing 7.

The second protruding portion 82 defines a flow channel 12 in cooperation with the first housing 7. The flow channel 12 introduces cooling air entering from the inflow port 831, and the introduced cooling air flows out from the outflow port 75a of the first housing 7 into the first housing 7.

A bearing and rotation stopper portions, which are not illustrated, are provided in an inner surface of the housing center portion 83.

The bearing of the housing center portion 83 is provided at a position opposing the bearing 711 (see FIG. 5) of the first housing 7, and the other end of the rotating shaft, described later, of the rectifying unit 6 is inserted thereto. The second housing 8 rotatably supports the rectifying unit 6 in cooperation with the first housing 7 as described above.

The pair of rotation stopper portions of the second housing 8 are provided at positions opposing the pair of rotation stopper portions 712 of the first housing 7, and are configured to limit the range of rotation of the rectifying unit 6 in the same manner as the rotation stopper portions 712.

The third housing 9 is formed of a high heat-resistant synthetic resin, and formed into a box shape having an opening on the +X side, and is configured to cover the −X side of the reflector 312 by being combined with the first housing 7 on the −X side as illustrated in FIG. 4.

The third housing 9 includes an upper surface 91 that defines the +Z side, a lower surface 92 that defines the −Z side, and side surfaces 93 and 94 that define the −Y side and the +Y side, and a back surface 95 that defines the −X side as illustrated in FIG. 4.

The upper surface 91 includes a cover portion 911 and the gripping portion 912 projecting in the +Z direction.

The cover portion 911 is formed so as to be connected to the cover portion 722 of the first housing 7, and the center portion is formed so as to be depressed to fit to the projecting portion 7221 of the cover portion 722 of the first housing 7.

The gripping portion 912 is formed so as to be connected to a −X side of the cover portion 911. The gripping portion 912 is opened on the −X side and is formed so as to have an upright wall between the gripping portion 912 and the cover portion 911. The gripping portion 912 is gripped by the user together with the gripping portion 721 of the first housing 7 when the light source unit 31 is demounted and mounted as described above.

The third housing 9 includes a protruding portion 96 positioned in the +Z direction of the input connector 314 and connected to the upper surface 91 and the side surface 93 as illustrated in FIG. 4.

The protruding portion 96 is positioned on the −Y side of the cover portion 722, and is formed to have a size enough to cover the +Z side and the −Y side of the projecting portion 7143, and the connecting conductors 315 in the vicinity of the input connector 314.

The third housing 9 is fixed to the first housing 7 by screws inserted into holes, which are not illustrated, provided at four corners.

Figure 8:
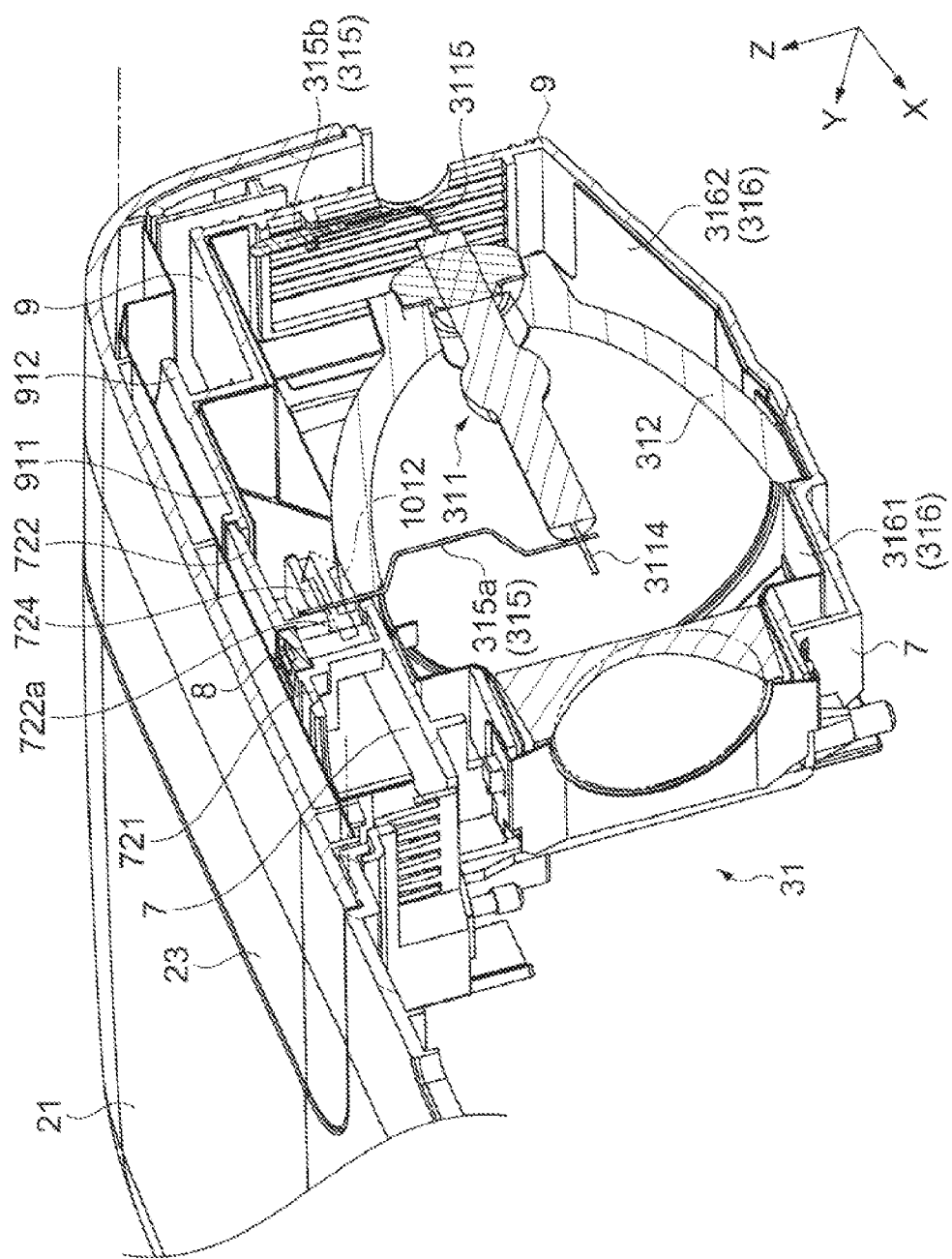
FIG. 8 is a cross-sectional view of the light source unit and a lid member of the embodiment.

FIG. 8 is a cross-sectional view of the light source unit 31 and the lid member 23.

The conductive members 316 include a first light-shielding member 3161 arranged in the first housing 7, a second light-shielding member 3162 arranged in the third housing 9 as illustrated in FIG. 8, and a fixing member 3163 arranged on the −X side of the reflector 312 as illustrated in FIG. 6.

The first light-shielding member 3161 is formed of a metal plate and is formed so as to cover the +X side in the first housing 7.

The second light-shielding member 3162 is formed of a metal plate and is formed so as to cover in the third housing 9.

The first light-shielding member 3161 and the second light-shielding member 3162 are formed so as to suppress the first housing 7 and the third housing 9 from directly being irradiated with light emitted from the light source 311. The first light-shielding member 3161 and the second light-shielding member 3162 suppress deterioration of the first housing 7 and the third housing 9 due to light.

The fixing member 3163 includes a plurality of spring members 3163a configured to urge an edge portion of the reflector 312, and has a function to fix the reflector 312 on which the light source 311 is fixed in the light source housing 5 in cooperation with the third housing 9 as illustrated in FIG. 6.

The fixing member 3163 is pressed by the third housing 9 when the third housing 9 is fixed to the first housing 7 with screws, and the spring members 3163a urge the reflector 312. Consequently, the reflector 312 on which the light source 311 is fixed is fixed in the light source housing 5.

Here, the connecting conductors 315 will be described. The connecting conductors 315 include a first connecting conductor 315a to be connected to the lead wire 3114 and a second connecting conductor 315b to be connected to the lead wire 3115, and each connecting conductor is connected to the input connector 314 as illustrated in FIG. 8.

The first connecting conductor 315a extends from the lead wire 3114 in the +Z direction as illustrated in FIG. 8, passes through the notch 724k as illustrated in FIG. 6, is bent in the −Y direction, is arranged between the cover portion 722 and the guide portion 724, and is connected to the input connector 314 positioned on the −Y side of the upright wall 7142. The first connecting conductor 315a is covered with an insulating member from the vicinity of the notch 724k between the cover portion 722 and the guide portion 724 to the input connector 314 and is laid so as to be restricted from projecting out in the −Y direction by the projecting portion 7143. In this manner, the first connecting conductor 315a is laid so that a portion passing through the notch 724k is arranged in the first housing 7 of the outflow port 722a, that is, at a position where cooling air flowed from the outflow port 722a passes, and portion covered with the insulating member is positioned by the cover portion 722 and the guide portion 724.

The second connecting conductor 315b extends from the lead wire 3115 in the +Z direction as illustrated in FIG. 8, and is passed through the U-groove 7145 of the first housing 7 and is connected to the input connector 314 as illustrated in FIG. 5. The second connecting conductor 315b is covered with the insulating member from the vicinity of the lead wire 3115 to the input connector 314, and is passed through the U-groove 7145, so that projecting out in the +Z direction and the −Y direction is restricted.

The third housing 9 is fixed to the first housing 7 with screws after the first connecting conductor 315a and the second connecting conductor 315b have been wired as described above.

In a state in which the third housing 9 is fixed to the first housing 7, the first connecting conductor 315a and the second connecting conductor 315b are accommodated in the first housing 7 and the third housing 9, and are covered with the light source housing 5 on the +Z side, that is, on the lid member 23 side as illustrated in FIG. 4.

In this manner, the upper surface 72 and the cover portion 722 of the first housing 7, the first protruding portion 81 of the second housing 8, the upper surface 91, the cover portion 911, and the protruding portion 96 of the third housing 9, that define the lid member 23 side of the light source housing 5 cover the lid member 23 side of the light source 311, the connecting conductors 315, and the conductive members 316 and correspond to lid-side forming portions. The cover portions 722 and 911 form part of the lid-side forming portions.

The rectifying unit 6 is configured to rotate in accordance with the standing position and the suspending position of the projector 1, branch cooling air entering from the inflow port 831, and change the amount of the cooling air to be flowed to the flow channels 11 and 12 provided in the light source housing 5.

The rectifying unit 6 is formed of a metal plate, and includes a rectifying unit body 61 having a trapezoidal shape in plan view, and a rotating shaft (which is not illustrated) provided on the side of the short side of the rectifying unit body 61 as illustrated in FIG. 4, although detailed illustration is omitted. The rectifying unit body 61 includes a notched opening 62 at an end thereof on the side of the long side, which is a side opposite from the rotating shaft.

The rectifying unit 6 is supported at the rotating shaft thereof by the first housing 7 and the second housing 8, and rotates under its own weight.

Flow of Cooling Air

Now, a flow of cooling air fed from the sirocco fan 41 will be described.

First of all, a flow of cooling air in the case where the projector 1 is placed in the standing position will be described.

When the projector 1 is in the standing position, the rectifying unit 6 comes into abutment with the rotation stopper portions 712 (see FIG. 5) of the first housing 7 and the rotation stopper portion of the second housing 8 under its own weight, and the end opposite from the rotating shaft is positioned on the −Z direction of the inlet port 713 as illustrated in FIG. 4.

A large part of cooling air 100 fed from the sirocco fan 41 and enters from the inflow port 831 hits against the rectifying unit 6, and is branched into cooling air 101 flowing in the flow channel 11 and cooling air 102 flowing toward the inlet port 713, and part of the cooling air 100 flows from the opening 62 of the rectifying unit 6 to the flow channel 12 (cooling air 103) as illustrated in FIG. 5.

The cooling air 101 flowing through the flow channel 11 is branched to cooling air 1011 guided to the outflow port 74a of the first housing 7 and cooling air 1012 flowing through the flow channel 13 and guided to the outflow port 722a as illustrated in FIG. 5 and FIG. 7. The cooling air 1011 flowed out from the outflow port 74a cools mainly the upper portion of the light source 311, specifically, the upper portion of the light-emitting portion 3111a, and the cooling air 1012 flowed out from the outflow port 722a mainly cools the cover portions 722 and 911. In this manner, the flow channel 11 corresponds to a main flow channel in which the cooling air to the light source 311 passes, and the flow channel 13 guides part of the cooling air flowing through the flow channel 11 as the main flow channel to the outflow port 722a.

The cooling air 102 entering from the inlet port 713 cools from the side of the light source 311 to the sealing portion 3111b (see FIG. 3).

The cooling air 103 passing through the flow channel 12 flows out from the outflow port 75a of the first housing 7, and cools the lower portion of the light source 311.

Then, the air that has cooled the object to be cooled by flowing through the flow channels 11 and 12, and the inlet port 713 is discharged to the outside of the external housing 2 by the axial flow fan 42 via the exhaust port 761 of the first housing 7.

Subsequently, a case where the projector 1 is in the suspending position will be described.

When the projector 1 is changed from the standing position to the suspending position, although illustration is omitted, the rectifying unit 6 rotates under its own weight and comes into abutment with the rotation stopper portions 712 (see FIG. 5) of the first housing 7, and the rotation stopper portion of the second housing 8, and the end of the rectifying unit 6 opposite to the rotating shaft is positioned at a position in the +Z direction of the inlet port 713.

A large part of cooling air fed from the sirocco fan 41 and enters from the inflow port 831 hits against the rectifying unit 6 and is branched into cooling air flowing toward the flow channel 12, and cooling air flowing toward the inlet port 713, and part of the cooling air flows from the opening 62 of the rectifying unit 6 to the flow channel 11.

The cooling air passing through the flow channel 12 flows from the outflow port 75a of the first housing 7, and cools mainly the upper portion of the light source 311, specifically the upper portion of the light-emitting portion 3111a.

In the same manner as the case of the standing position, the cooling air entering from the inlet port 713 cools from the side of the light source 311 to a portion of the sealing portion 3111b (see FIG. 3) in the vicinity of the distal end portion thereof.

The cooling air passing through the flow channel 11 flows from the outflow ports 74a and 722a of the first housing 7. The cooling air flowed out from the outflow port 74a cools mainly the lower portion of the light source 311, and the cooling air flowed out from the outflow port 722a mainly cools the cover portions 722 and 911.

In this manner, when the projector 1 is positioned in the standing position and in the suspending position, the flow channels 11 and 12 guide a larger amount of cooling air to the upper portion of the light source 311 than to the lower portion thereof and the flow channel 11 guides cooling air to the cover portions 722 and 911, that is, to at least part of the lid-side forming portions.

As described thus far, according to the embodiment, the following effects are achieved.

(1) Since the light source housing 5 has the lid-side forming portions, the user is prevented from touching or coming close to the light source 311, the connecting conductors 315, and the conductive members 316 arranged in the light source housing 5 when replacing the light source unit 31.

The light source housing 5 is provided with the flow channel 13 configured to guide the cooling air to the cover portions 722 and 911 that define part of the lid-side forming portions, the cover portions 722 and 911 that are increased in temperature may be cooled down by covering the lid member 23 side of the light source 311. In particular, when the projector 1 is in the standing position in which the lid member 23 is positioned above the light source unit 31, the lid-side forming portions are positioned above the light source 311, so that more remarkable advantages are achieved.

Therefore, the light source 311, the connecting conductors 315, and the conductive members 316 are reliably kept away from the user when the user mounts and demounts the light source unit 31, whereby the deterioration of the light source housing 5 due to the temperature may be suppressed while enhancing wiring flexibility of the connecting conductors 315 and the flexibility in shape of the conductive members 316. Therefore, the projector 1 provided with the light source unit 31 which has a longer lifetime while achieving easiness of manufacture and improvement of design flexibility is provided.

(2) The first housing 7 and the second housing 8 are combined, and hence the inflow port 831 and the flow channels 11 and 13 are easily formed, and part of the cooling air 101 entering from the inflow port 831 flows out from the outflow port 722a and is fed to the cover portions 722 and 911. Therefore, a configuration of feeding the cooling air to at least part of the lid-side forming portions is achieved with a simple structure.

The flow channel 13 is also formed so as to be branched from the flow channel 11 as a main flow channel. Accordingly, since an area through which the cooling air is caused to flow may be increased in comparison with a case where the flow channel 11 as the main flow channel and the flow channel 13 are formed individually, efficient cooling of the object to be cooled is achieved.

(3) The first connecting conductor 315a to be connected to the lead wire 3114, being partly arranged in the outflow port 722a in the interior of the first housing 7, is cooled by the cooling air fed to the lid-side forming portions. Therefore, effective cooling of the light source unit 31 is enabled.

(4) The light source housing 5 includes the guide portion 724 configured to position the first connecting conductor 315a in cooperation with the cover portion 722. Therefore, the first connecting conductor 315a is reliably laid at a predetermined position on the lid member 23 side of the light source 311. Therefore, further stable cooling of the first connecting conductor 315a by the cooling air 1012 fed to the lid-side forming portions and reduction of the load applied to the first connecting conductor 315a during the step of manufacturing the light source unit 31 and when handling the light source unit 31 are achieved.

(5) Since the light source unit 31 is provided with the above described flow channels 11 and 12, and the rectifying unit 6 having the opening 62, a larger amount of cooling air is guided to the upper portion of the light source 311 than to the lower portion, so that well balanced cooling of the upper portion and the lower portion of the light source 311 is achieved, and also the cover portions 722 and 911 may be cooled in the standing position and the suspending position. The cooling air guided to the cover portions 722 and 911 is smaller in amount in the suspending position than in the case of the standing position. However, in the suspending position, the cover portions 722 and 911 are positioned below the light source 311, and hence temperature increase is not much. Therefore, cooling is achieved with a small amount of cooling air.

Modification

The embodiment described above may be modified as described below.

The projector 1 of the above described embodiment is formed so that the light source unit 31 is mounted and demounted from above in the standing position. However, the projector may be configured in such a manner that the light source unit 31 is mounted and demounted from below in the standing position. In this case as well, the light source housing is configured to have lid-side forming portions that cover the light source and the gripping portion side of the connecting conductor and the flow channel configured to guide the cooling air to at least part of the lid-side forming portions, so that the same advantages as the projector 1 of the embodiment is achieved in the suspending position and the standing position.

The configuration in which the light source housing has lid-side forming portions that cover the light source and the gripping portion side of the connecting conductor and the flow channel configured to guide the cooling air to at least part of the lid-side forming portions may be applied to the light source unit that is not provided with the rectifying unit 6.

Although the projector 1 in the embodiment described above employs the transmissive liquid crystal panel as the light-modulating unit, a reflective liquid crystal panel may also be employed. The light-modulating unit may employ a micro mirror display device.

The light-modulating unit of the embodiments described above employs a so-called three-panel system, in which three light-modulating units corresponding to R-light, G-light, and B-light are used. Instead, however, a single plate system may also be employed. Alternatively, the light-modulating unit of the embodiments described above may also be applied to a projector including two, four or more of the light-modulating units.

The light source unit is not limited to that having a discharging type light source, and lamps of other types or solid light sources such as light-emitting diodes may be employed as long as the light source unit is configured to be mountable and demountable by the user.

What is claimed is:

1. A light source unit comprising:
a light source;
a connecting conductor configured to supply power to the light source;
a light source housing configured to accommodate the light source and the connecting conductor, and including a gripping portion;
a main flow channel configured to allow the cooling air to flow to the light source; and
a reflector configured to reflect light emitted from the light source,
wherein the light source housing includes:
a lid-side forming portion configured to cover the light source and the gripping portion side of the connecting conductor and including a cover portion configured to project in a same direction of the gripping portion,
an outflow port configured to allow the cooling air to go out toward the lid-side forming portion, and
a flow channel configured to guide a part of cooling air flowing through the main flow channel to the outflow port, and
wherein;
the cooling air flowed out from the outflow port mainly cools the cover portion,
the light source includes a light-emitting tube having a pair of electrodes and a pair of lead wires configured to be electrically connected to the pair of electrodes, respectively,
one of the pair of lead wires is arranged on a side of the reflector where the light is reflected,
the connecting conductor includes a first connecting conductor to be connected to the one of the lead wires and a second connecting conductor to be connected to the other lead wire, and
part of the first connecting conductor is arranged at the position where the cooling air flowing out from the outflow port of the light source housing passes.

2. The light source unit according to claim 1, wherein the light source housing includes a guide portion configured to position the connecting conductor in cooperation with the lid-side forming portion.

3. A projector comprising:
the light source unit according to claim 1;
an external housing configured to accommodate the light source unit and having an opening through which the light source unit is mounted and demounted; and
a lid member configured to close the opening.

4. The projector according to claim 3, wherein
the light source unit includes a reflector configured to reflect light emitted from the light source,
the light source includes a light-emitting tube having a pair of electrodes and a pair of lead wires configured to be electrically connected to the pair of electrodes, respectively,
one of the pair of lead wires is arranged on a side of the reflector where the light is reflected,
the connecting conductor includes a first connecting conductor to be connected to the one of the lead wires and a second connecting conductor to be connected to the other lead wire, and
part of the first connecting conductor is arranged at the position where the cooling air flowing out from the outflow port of the light source housing passes.

5. The projector according to claim 3, wherein
the light source housing includes a guide portion configured to position the connecting conductor in cooperation with the lid-side forming portion.
6. The light source unit according to claim 1, wherein
the reflector has a reflective surface configured to reflect light emitted from the light source, and
the outflow port is configured to guide cooling air to a rear surface of the reflector opposite the reflective surface.

* * * * *